(12) United States Patent
Mallary

(10) Patent No.: US 8,908,330 B1
(45) Date of Patent: Dec. 9, 2014

(54) SPIN TORQUE OSCILLATOR FOR MICROWAVE ASSISTED MAGNETIC RECORDING WITH OPTIMAL GEOMETRIES

(71) Applicant: Western Digital Technologies, Inc., Irvine, CA (US)

(72) Inventor: Michael L. Mallary, Sterling, MA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/725,683

(22) Filed: Dec. 21, 2012

(51) Int. Cl.
*G11B 5/127* (2006.01)
*G11B 5/60* (2006.01)
*G11B 5/00* (2006.01)

(52) U.S. Cl.
CPC ...... *G11B 5/6005* (2013.01); *G11B 2005/0024* (2013.01)
USPC ........................................ 360/125.3; 360/128

(58) Field of Classification Search
CPC .............................................. G11B 2005/0024
USPC ........ 360/125.3, 125.31, 125.71–125.74, 128
See application file for complete search history.

(56) References Cited

U.S. PATENT DOCUMENTS

| | | | |
|---|---|---|---|
| 4,656,546 A | 4/1987 | Mallory | |
| 7,075,756 B1 | 7/2006 | Mallary et al. | |
| 7,473,478 B2 | 1/2009 | Sbiaa et al. | |
| 7,589,600 B2 | 9/2009 | Dimitrov et al. | |
| 7,616,412 B2 | 11/2009 | Zhu et al. | |
| 7,678,475 B2 | 3/2010 | Slavin et al. | |
| 7,791,829 B2 | 9/2010 | Takeo et al. | |
| 7,940,485 B2 | 5/2011 | Kudo et al. | |
| 7,957,098 B2 | 6/2011 | Yamada et al. | |
| 7,965,474 B2 | 6/2011 | Sato et al. | |
| 7,982,996 B2 | 7/2011 | Smith et al. | |
| 8,027,118 B2 | 9/2011 | Ezawa et al. | |
| 8,064,244 B2 | 11/2011 | Zhang et al. | |
| 8,085,490 B2 | 12/2011 | Franca-Neto et al. | |
| 8,139,322 B2 | 3/2012 | Yamada et al. | |
| 8,154,825 B2 | 4/2012 | Takashita et al. | |
| 8,164,854 B2 | 4/2012 | Takagishi et al. | |
| 8,174,798 B2 | 5/2012 | Nagasawa et al. | |
| 8,194,361 B2 | 6/2012 | Kudo et al. | |
| 8,203,389 B1 | 6/2012 | Zhou et al. | |
| 8,208,219 B2 | 6/2012 | Zhang et al. | |
| 2008/0112087 A1 | 5/2008 | Clinton et al. | |
| 2009/0059418 A1 | 3/2009 | Takeo et al. | |
| 2009/0080120 A1 | 3/2009 | Funayama et al. | |
| 2009/0225465 A1 | 9/2009 | Iwasaki et al. | |
| 2009/0244792 A1* | 10/2009 | Nakayama et al. | 360/324.11 |
| 2009/0257151 A1 | 10/2009 | Zhang et al. | |
| 2009/0262457 A1* | 10/2009 | Rivkin et al. | 360/110 |
| 2009/0310254 A1 | 12/2009 | Oikawa et al. | |
| 2009/0316303 A1 | 12/2009 | Yamada et al. | |
| 2009/0316304 A1 | 12/2009 | Funayama et al. | |
| 2010/0007992 A1 | 1/2010 | Yamada et al. | |

(Continued)

*Primary Examiner* — Adam B Dravininkas

(57) ABSTRACT

A microwave assisted magnetic recording (MAMR) write head includes a write pole tip, a trailing shield, and a spin torque oscillator between the write pole tip and the trailing shield. The spin torque oscillator may have a substantially cylindrical member and a non-cylindrical member extending from the substantially cylindrical member toward an air bearing surface (ABS). The non-cylindrical member may have a substantially rectangular and/or flat surface facing the ABS. Alternatively, the spin torque oscillator may include a substantially cylindrical member with a rectangular and/or flat surface facing the ABS that is lapped into the substantially cylindrical member.

14 Claims, 4 Drawing Sheets

(56) References Cited

U.S. PATENT DOCUMENTS

| | | |
|---|---|---|
| 2010/0007996 A1 | 1/2010 | Iwasaki et al. |
| 2010/0027158 A1 | 2/2010 | Takagishi et al. |
| 2010/0027161 A1 | 2/2010 | Takagishi et al. |
| 2010/0033881 A1 | 2/2010 | Carey et al. |
| 2010/0061019 A1* | 3/2010 | Benakli et al. ............. 360/244.1 |
| 2010/0073804 A1* | 3/2010 | Ikeda et al. ..................... 360/59 |
| 2010/0073806 A1 | 3/2010 | Koui et al. |
| 2010/0079919 A1 | 4/2010 | Nagasawa et al. |
| 2010/0110592 A1 | 5/2010 | Koui et al. |
| 2010/0134922 A1 | 6/2010 | Yamada et al. |
| 2010/0142088 A1 | 6/2010 | Iwasaki et al. |
| 2010/0195247 A1 | 8/2010 | Mochizuki et al. |
| 2010/0232053 A1 | 9/2010 | Yano et al. |
| 2011/0007431 A1 | 1/2011 | Braganca et al. |
| 2011/0018647 A1 | 1/2011 | Lee et al. |
| 2011/0019305 A1 | 1/2011 | Suss et al. |
| 2011/0038080 A1 | 2/2011 | Alex et al. |
| 2011/0038081 A1 | 2/2011 | Contreras et al. |
| 2011/0141629 A1 | 6/2011 | Braganca et al. |
| 2011/0216436 A1* | 9/2011 | Igarashi et al. ................. 360/61 |
| 2012/0002331 A1 | 1/2012 | Oikawa et al. |
| 2012/0038430 A1 | 2/2012 | Kim et al. |
| 2012/0069465 A1 | 3/2012 | Sato et al. |
| 2012/0113540 A1 | 5/2012 | Zhang et al. |
| 2012/0113543 A1* | 5/2012 | Shiimoto et al. ................ 360/75 |
| 2012/0120518 A1* | 5/2012 | Matsubara et al. ............. 360/55 |
| 2012/0162823 A1 | 6/2012 | Ikai et al. |
| 2012/0176702 A1* | 7/2012 | Yamada et al. ............... 360/244 |
| 2012/0236633 A1* | 9/2012 | Saida et al. ................... 365/173 |
| 2013/0050875 A1* | 2/2013 | Yamada et al. ............. 360/125.3 |
| 2013/0222941 A1* | 8/2013 | Sugiura et al. ................. 360/75 |

* cited by examiner

SPIN TORQUE OSCILLATOR FOR MICROWAVE ASSISTED MAGNETIC RECORDING WITH OPTIMAL GEOMETRIES

FIELD

The present disclosure relates generally to perpendicular magnetic recording for hard disk drives, and more particularly, to perpendicular magnetic recording with a spin torque oscillator for microwave assisted magnetic recording.

BACKGROUND

For years, the hard disk drive industry has focused on longitudinal magnetic recording to record data on disks. In longitudinal recording, the direction of the magnetic charge for each data bit is aligned horizontally to the disk that spins inside the hard drive. More recently, perpendicular magnetic recording (PMR) has become the favored technology. In PMR, the direction of magnetic charge for each data bit is aligned vertically to the spinning disk, providing the ability to substantially increase aerial density by providing more data on a disk than is possible with conventional longitudinal recording.

New technologies are being developed to further increase aerial density by reducing the size of the magnetic grains that comprise the data bits in the recording layer on the surface of the disk. This reduction in the size of magnetic grains requires a corresponding increase in the magnetic anisotropy in the recording layer to maintain thermal stability. Any increase in magnetic anisotropy, however, requires a stronger write field to switch the magnetic grains and write to the disk. Today, the ability of write heads to produce sufficient write field strength is one of the limiting factors in reducing the magnetic grain size to increase aerial density.

One possible solution is PMR with high frequency assisted writing using a spin torque oscillator (STO). This type of recording, also called microwave assisted magnetic recording (MAMR), applies a microwave field from the STO to the magnetic grains embedded in the recording layer on the surface of the disk. The microwave field may have a frequency close to the resonance frequency of the magnetic grains to facilitate the switching of the magnetization of the grains at lower write fields than would otherwise be possible without assisted recording.

The STO may be located between the write pole tip and the trailing shield of the PMR write head. The STO is a multilayer film stack that includes a polarization layer and a field generating layer. When an electrical current is applied to the STO, the polarization layer generates a spin-polarized current. The spin-polarized current is used to excite magnetic oscillations in the field generating layer and thereby generate a microwave field useful for MAMR applications.

The conventional STO has a rectangular prism shape. However, this shape does not provide sufficient control over the STO frequency (i.e., magnetic oscillations) with applied current to optimize the microwave frequency and the write field to the media requirements. A cylindrical shaped STO, on the other hand, provides better frequency sensitivity with applied current, but has a very narrow stripe height lapping range that will yield an acceptable microwave field strength and magnetic write width.

SUMMARY

Several aspects of the present invention will be described more fully hereinafter with reference to various embodiments of apparatuses and methods related to PMR with a spin torque oscillator for MAMR.

One aspect of an MAMR write head includes a write pole tip, a trailing shield, and a spin torque oscillator between the write pole tip and the trailing shield, the spin torque oscillator having a substantially cylindrical member and a non-cylindrical member extending from the substantially cylindrical member toward an air bearing surface.

Another aspect of an MAMR write head includes a write pole tip, a trailing shield, and a spin torque oscillator between the write pole tip and the trailing shield, the spin torque oscillator having a substantially cylindrical member and a second member extending from the substantially cylindrical member toward an air bearing surface, the second member having a substantially flat surface facing the air bearing surface.

A further aspect of an MAMR write head includes a write pole tip, a trailing shield, and a spin torque oscillator between the write pole tip and the trailing shield, the spin torque oscillator having a substantially cylindrical member and a second member extending from the substantially cylindrical member toward an air bearing surface, the second member having a substantially rectangular surface facing the air bearing surface.

One aspect of a magnetic hard disk drive includes a rotatable magnetic recording disk, and an MAMR write head arranged within the hard disk drive to have an air bearing interface with the magnetic recording disk when the magnetic recording disk is rotated, wherein the MAMR write head comprises a write pole tip, a trailing shield, and a spin torque oscillator between the write pole tip and the trailing shield, the spin torque oscillator having a substantially cylindrical member and a non-cylindrical member extending from the substantially cylindrical member toward an air bearing surface.

One aspect of a spin torque oscillator for an MAMR write head includes a substantially cylindrical member configured to be positioned between a write pole tip and a trailing shield of the MAMR write head, and a non-circular member extending from the substantially cylindrical member, the non-cylinder member being configured to extend toward an air bearing surface when the substantially cylindrical member is positioned between the write pole tip and the trailing shield.

It will be understood that other aspects of the present invention will become readily apparent to those skilled in the art from the following disclosure, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
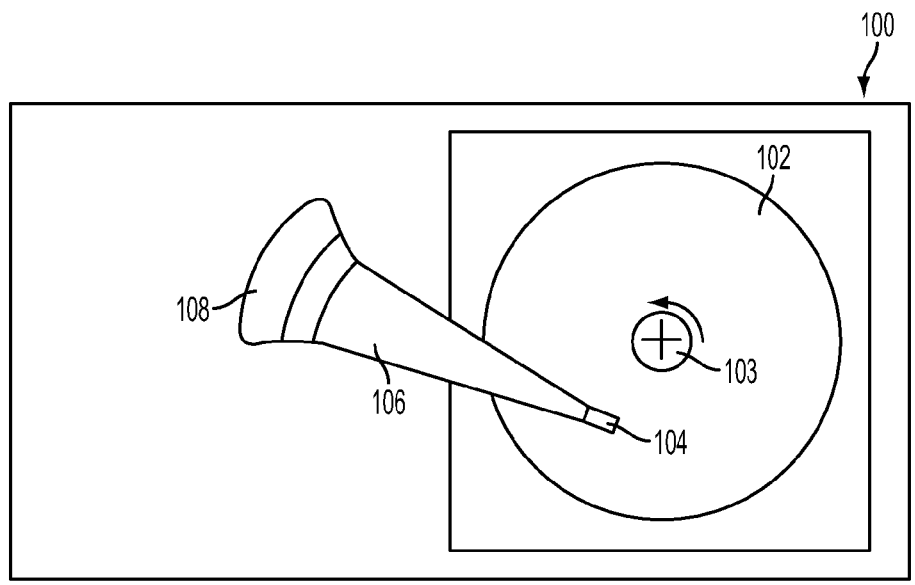
FIG. 1 is a conceptual view an exemplary embodiment of a PMR hard drive disk.

The detailed description is intended to provide a description of various exemplary embodiments of the present invention and is not intended to represent the only embodiments in which the invention may be practiced. The term "exemplary" used throughout this disclosure means "serving as an example, instance, or illustration," and should not necessarily be construed as preferred or advantageous over other embodiments. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Various aspects of the present invention may be described with reference to certain shapes and geometries. Any reference to a component having a particular shape or geometry, however, should not be construed as limited to the precise shape illustrated or described, but shall include deviations that result, for example, from manufacturing techniques and/or tolerances. By way of example, a component, or any part of a component, may be illustrated or described as rectangular, but in practice may have rounded or curved features due to manufacturing techniques and/or tolerances. Accordingly, the components illustrated in the drawings are schematic in nature and their shapes are not intended to illustrate the precise shape of the component, and therefore, not intended to limit the scope of the present invention.

In the following detailed description, various aspects of the present invention will be presented in the context of an STO for PMR hard disk drives. While these inventive aspects may be well suited for this application, those skilled in the art will realize that such aspects may be extended to other applications, such as memory, radio-frequency oscillators, and other suitable spin torque transfer applications. Accordingly, any reference to an STO for PMR hard drive disk is intended only to illustrate the various aspects of the present invention, with the understanding that such aspects may have a wide range of applications.

FIG. 1 is a conceptual view of an exemplary PMR hard drive disk. The PMR hard drive disk 100 is shown with a rotatable magnetic disk 102. The magnetic disk 102 may be rotated on a spindle 103 by a disk drive motor (not shown) located under the magnetic disk 102. A PMR head 104 may be used to read and write information by detecting and modifying the magnetic polarization of the recording layer on the disk's surface. The PMR head 104 is generally integrally formed with a carrier or slider (not shown). The function of the slider is to support the PMR head 104 and any electrical connections between the PMR head 104 and the rest of the PMR hard drive disk 100. The slider is mounted to a positioner arm 106 which may be used to move the PMR head 104 on an arc across the rotating magnetic disk 102, thereby allowing the PMR head 104 to access the entire surface of the magnetic disk 102. The arm 106 may be moved using a voice coil actuator 108 or by some other suitable means.

The slider is aerodynamically designed to fly above the magnetic disk 102 by virtue of an air bearing created between the surface of the slider and the rotating magnetic disk 102. This surface of the slider is referred to as an air bearing surface (ABS). The ABS is the portion of the slider surface which is closest to the rotating magnetic disk 102, which is typically the PMR head 104. In order to maximize the efficiency of the PMR head 104, the sensing elements (i.e., the read and write heads) are designed to have precise dimensional relationships to each other. In addition, the distance between the ABS and the rotating magnetic disk 102 is tightly controlled. The dimension that relates to the write function is known as the throat height and the dimension that relates to the read function is known as the stripe height. Both the stripe height and the throat height are controlled by a lapping process.

Figure 2A:
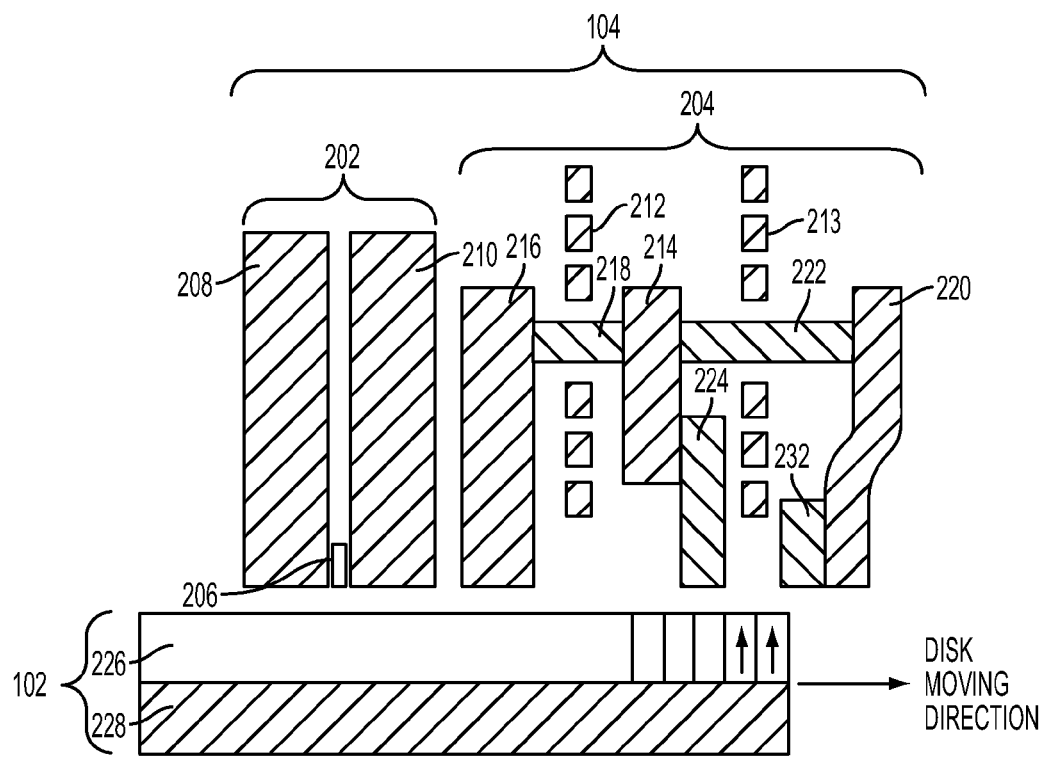
FIG. 2A is a cross-section view of an exemplary embodiment of a PMR head.

FIG. 2A is a cross-section view of an exemplary PMR head. The PMR head 104 is formed on the slider (not shown) and includes a PMR read head 202 and a PRM write head 204. The PMR read head 202 includes a read element 206 positioned between two shields 208 and 210. The PMR write head 204 includes a main pole 214 coupled to a pair of return poles. The first return pole 216 is coupled to the main pole 214 by a first yoke 218 and the second return pole 220 is coupled to the main pole 214 pole by a second yoke 222. The main pole 214 includes a write pole tip 224 that has a surface facing the magnetic disk 102. Two thin film coils 212, 213 are positioned around the main pole 214. The magnetic disk 102 is shown with a hard magnetic recording layer 226 and a soft magnetic under-layer 228, which together provide a flux path between the main pole 214 and the return poles 216 and 220.

In this example, the magnetic disk 102 is moved past the PMR head 104 along a circular track of the magnetic disk 102. When current is applied to the thin film coils 212, 213 a perpendicular magnetic field is created between the write pole tip 224 and the soft magnetic under-layer 228. The magnetic flux is collected by the soft magnetic under-layer 228 and returned to the return poles 216 and 220 to complete the magnetic circuit. The result is a magnetic charge with a perpendicular orientation on the segment of the magnetic recording layer 218 of the disk 102 immediately below the write pole tip 224.

Figure 2B:
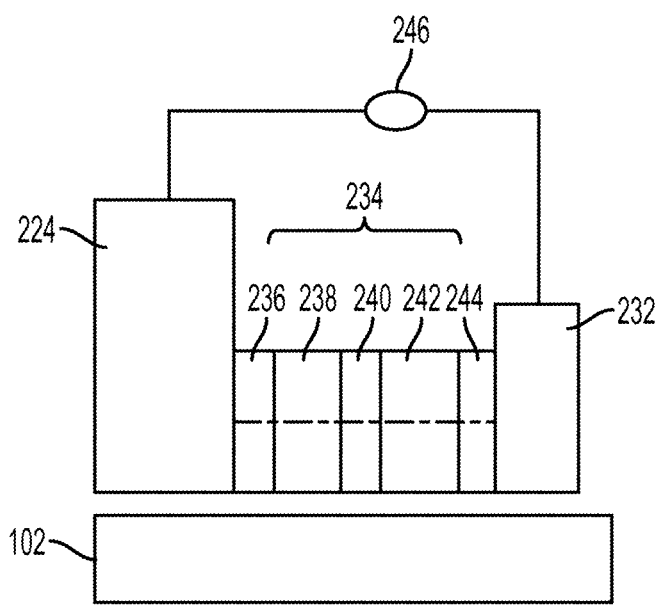
FIG. 2B is a cross-section view of a portion of the PMR head of FIG. 2A with an exemplary embodiment of an STO.

The PMR write head 204 is also shown with a trailing shield 232 separated from the write pole tip 224. The trailing shield 232 alters the angle of the write field as well as its gradient, and makes writing more efficient. An STO may be positioned between the write pole tip 224 and the trailing shield 232. An exemplary embodiment of an STO is illustrated in FIG. 2B. The STO 234 may include a field generating layer 242 and a polarization layer 238 separated by an interlayer 240. The interlayer 240 may be formed from copper or any other suitable material which provides electrical coupling and magnetic insulation between the field generating layer 242 and the polarization layer 238. The STO 234 may have other layers that have been omitted from this description for the purpose of clarity. A spacer 236 may also be located between the polarization layer 238 and the write pole tip 224, and another spacer 244 may be located between the field generating layer 242 and the trailing shield 232. These spacers 236, 244 may be formed from ruthenium (Ru), tantalum (Ta), or any other suitable material which provide electrical coupling and magnetic insulation and which depolarizes the current passing between. A current source 246 may be connected across the STO 234 through the write pole tip 224 and the trailing shield 232. Alternatively, the current source 246 may be connected across the STO 234 by electrodes attached to opposite ends of the STO 234.

In the exemplary embodiment shown, current is injected into the STO 234 through the write pole tip 224 and the trailing shield 232. The polarization layer 238 generates a spin-polarized current. The spin-polarized current is used to excite magnetic oscillations in the field generating layer 242 and thereby generate a microwave field useful for MAMR applications.

The geometry of the STO may take on various forms depending upon the particular application and the overall design constraints. By way of example, the STO may have a substantially cylindrical member with a substantially flat and/or rectangular surface facing the ABS. In at least one exemplary embodiment of an STO, the substantially flat and/or rectangular surface may be part of a non-cylindrical member that extends from the substantially cylindrical member toward the ABS. The non-cylindrical member may be a substantially rectangular prism member or other suitable shape. Alternatively, the substantially flat and/or rectangular surface may be lapped directly into the substantially cylindrical member.

Those skilled in the art will readily appreciate that the term "substantially" used throughout this disclosure to describe the various geometries of an STO is intended to cover shapes that in implementation may deviate in accordance with manufacturing processes and/or tolerances. By way of example, it is expected that the geometry of an STO will vary as a result of standard wafer processing techniques. A cylindrical member of an STO, for example, may have a conical frustum shape. Moreover, the faces of the cylindrical member may be circular or elliptical. Accordingly, it is intended that an STO described as having a substantially cylindrical member include a cylindrical member, an elliptic cylindrical member, a conical frustum member, any combination thereof, or any other shape that results from manufacturing processes and/or tolerances.

Alternatively, the cylindrical member of the STO may be fabricated from an n-sided polygonal prism for reasons related to fabrication. By way of example, the cylindrical member could be constructed as a hexagonal or octagonal prism, where n=6 or 8, respectively. For higher values of n, the STO member will appear more cylindrical, however, it is envisioned that even a course cylindrical member fabricated from a pentagonal prism would be sufficient for certain applications. Accordingly, a substantially cylindrical member of an STO is also intended to include an n-sided polygonal prism, where n is equal to or greater than 5.

As discussed above, the substantially cylindrical member of the STO may have a non-cylindrical member extending from the substantially cylindrical member. The non-cylindrical member may be a substantially rectangular prism member with a substantially flat and/or rectangular surface facing the ABS. As those skilled in the art will readily appreciate, the rectangular prism member may have a trapezoidal prism shape from the manufacturing process. Accordingly, it is intended that an STO having a substantially rectangular prism member include a rectangular prism member, a trapezoidal prism member, or any other shape that results from manufacturing processes and/or tolerances.

The rectangular surface facing the ABS, whether being part of the non-cylindrical member or directly lapped into the substantially cylindrical member, may be trapezoidal and the flatness of the surface may vary due to manufacturing tolerances and deviations. Accordingly, an STO having a substantially rectangular surface and/or flat surface shall include a rectangular, trapezoidal, and other shaped surfaces with varying degrees of flatness.

As described in the background portion of this disclosure, the conventional rectangular prism shaped STO does not provide sufficient control over the STO frequency (i.e., magnetic oscillations) with applied current to optimize the microwave frequency and the write field to the media requirements. A cylindrical shaped STO, on the other hand, provides better frequency sensitivity with applied current, but has a very narrow stripe height lapping range that will yield an acceptable microwave field strength and magnetic write width. As will be described in greater detail shortly, a modified cylindrical shaped STO, designed to have a minimal impact on the self-demagnetizing field, overcomes this problem while maintaining adequate control of the STO frequency with applied current which facilitates tuning the microwave frequency to the MAMR media requirements and allows the STO to achieve higher frequencies than possible with a conventional rectangular prism shaped STO.

Figure 3A:
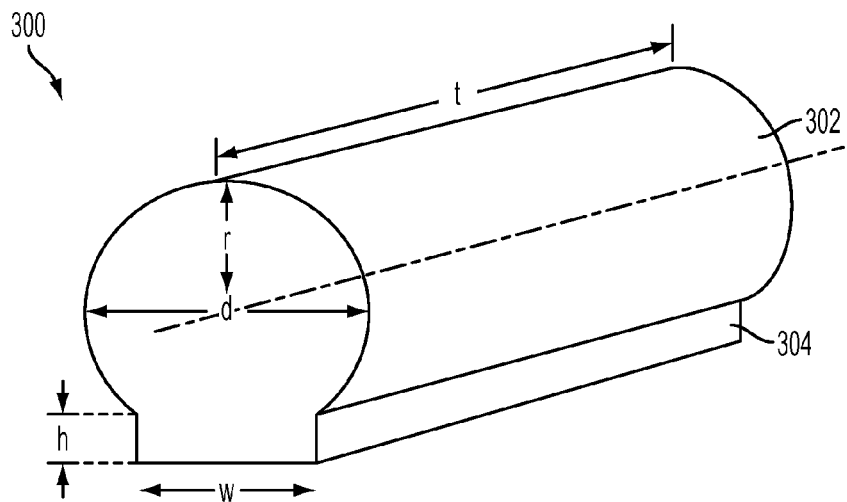
FIG. 3A is a perspective view of an exemplary embodiment of an STO for use in a PMR head.

One exemplary embodiment of an STO is shown in FIG. 3A. In this example, the STO 300 includes a cylindrical member 302 with a "peg" or rectangular prism member 304 extending from the cylinder member 302. The width (w) of the rectangular prism member 304 may be approximately 70% of the diameter (d) of the cylindrical member 302. By way of example, the width (w) of the rectangular prism member 304 may be approximately 18 nm, and the diameter (d) of the cylindrical member 302 may be approximately 26 nm. These dimensions may vary for any given embodiment of an STO. Preferably, the diameter (d) of the cylindrical member 302 is at least 10% greater than the width (w) of the rectangular prism member 304. The thickness (t) of the STO 300 may be designed to accommodate the requisite gap between the write pole tip and the trailing shield. Those skilled in the art will be readily able to determine the appropriate dimensions of the STO for the PMR write head depending on the particular application and the overall design constraints imposed on the hard disk drive system.

Figure 3B:
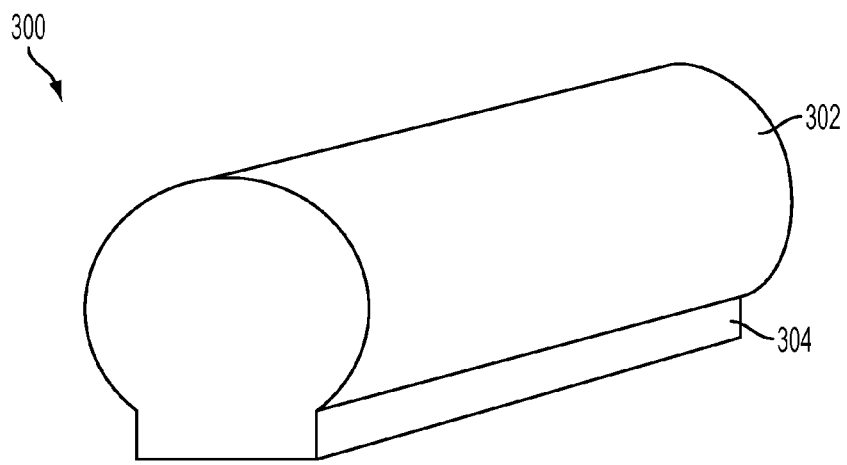
FIG. 3B is a perspective view of another exemplary embodiment of an STO for use in a PMR head.

The exemplary embodiment of the STO described thus far results in less variation of the self-demagnetizing field than the conventional rectangular prism shaped STO design over a wide range of peg heights. Specifically, the height (h) of the peg, or rectangular prism member, may be anywhere between 0%-85% of the radius (r) of the cylindrical member 302. This provides a wide lapping range during the manufacturing process. An example of an STO 300 with a peg height almost equal to 0% of the cylindrical member's radius is shown in FIG. 3B. In this example, the STO 300 is lapped right up to the cylindrical member 302. By way of example, if the width (w) of the peg is 70% of the diameter (d) of the cylindrical member 302, the height (h) of the peg would be 14% of the diameter (d) of the cylindrical member 302.

Figure 3C:
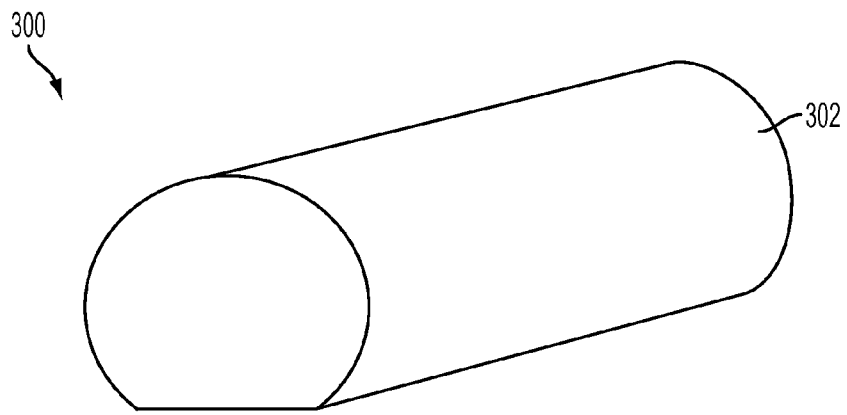
FIG. 3C is a perspective view of a further exemplary embodiment of an STO for use in a PMR head.
Figure 3D:
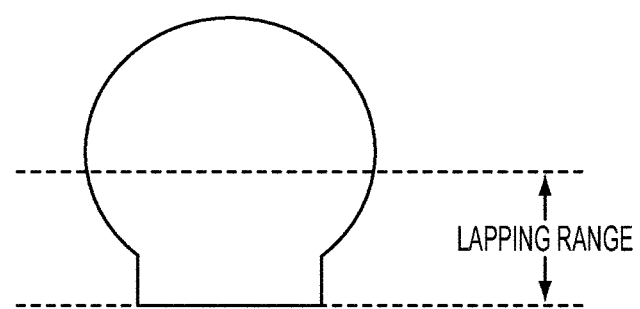
FIG. 3D is a schematic representation depicting a lapping range for an exemplary embodiment of an STO for use in a PMR head.

In an alternative embodiment, the STO 300 may be lapped into the cylindrical member 302 during the manufacturing process. An example of this embodiment is shown in FIG. 3C where the face 306 of the substantially cylindrical member 302 comprises a circle with a circular segment defined by a chord cut away. The STO 300 may be lapped into the cylindrical member up to at least 33% of its diameter (d) resulting in a substantially improved lapping range compared with conventional cylindrical shaped STO designs. The entire lapping range for one embodiment of an STO is shown in FIG. 3D.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A microwave assisted magnetic recording (MAMR) write head, comprising:
    a write pole tip;
    a trailing shield; and
    a spin torque oscillator between the write pole tip and the trailing shield, wherein an entire surface of the spin torque oscillator in one plane has:
    a first member having a substantially circular surface; and
    a second member having a non-circular surface, the second member extending from the first member toward an air bearing surface.

2. The MAMR write head of claim 1 wherein the second member comprises a substantially rectangular surface.

3. The MAMR write head of claim 2 wherein the first member comprises a central axis extending between the write pole tip and the trailing shield, and wherein a diameter of the first member is greater than a width of the substantially rectangular surface traversing the central axis.

4. The MAMR write head of claim 3 wherein the diameter of the first member is at least 10% greater than the width of the substantially rectangular surface.

5. The MAMR write head of claim 1 wherein the second member comprises a substantially flat edge facing the air bearing surface.

6. The MAMR write head of claim 1 wherein the second member is configured to define a track width on a magnetic recording disk.

7. A microwave assisted magnetic recording (MAMR) write head, comprising:
    a write pole tip;
    a trailing shield; and
    a spin torque oscillator between the write pole tip and the trailing shield, wherein an entire surface of the spin torque oscillator in one plane has:
        a member having a substantially circular surface; and
        a substantially flat edge facing an air bearing surface.

8. The MAMR write head of claim 7 wherein the member comprises a central axis extending between the write pole tip and the trailing shield, and wherein a diameter of the member is greater than a width of the substantially flat edge traversing the central axis.

9. The MAMR write head of claim 8 wherein the diameter of the member is at least 10% greater than the width of the substantially flat edge.

10. The MAMR write head of claim 7 wherein the spin torque oscillator further comprises a second member extending from the member having the substantially circular surface toward the air bearing surface, the second member having the substantially flat edge facing the air bearing surface.

11. The MAMR write head of claim 10 wherein the second member comprises a non-circular surface.

12. The MAMR write head of claim 10 wherein the second member is configured to define a track width on a magnetic recording disk.

13. A magnetic hard disk drive, comprising:
    a rotatable magnetic recording disk; and
    a microwave assisted magnetic recording (MAMR) write head arranged within the hard disk drive to have an air bearing interface with the magnetic recording disk when the magnetic recording disk is rotated, wherein the MAMR write head comprises a write pole tip, a trailing shield, and a spin torque oscillator between the write pole tip and the trailing shield, wherein an entire surface of the spin torque oscillator in one plane has:
        a first member having a substantially circular surface; and
        a second member having a non-circular surface extending from the first member toward the air bearing surface.

14. A spin torque oscillator for a microwave assisted magnetic recording (MAMR) write head, comprising:
    a surface in one plane, wherein the entire surface in the one plane comprises:
        a first member having a substantially circular surface, the first member being configured to be positioned between a write pole tip and a trailing shield of the MAMR write head; and
        a second member having a non-circular surface, the second member extending from the first member, the second member being configured to extend toward an air bearing surface when the first member is positioned between the write pole tip and the trailing shield.

* * * * *